(No Model.)
G. H. MACKAY.
VEHICLE TIRE.
No. 580,345. Patented Apr. 6, 1897.
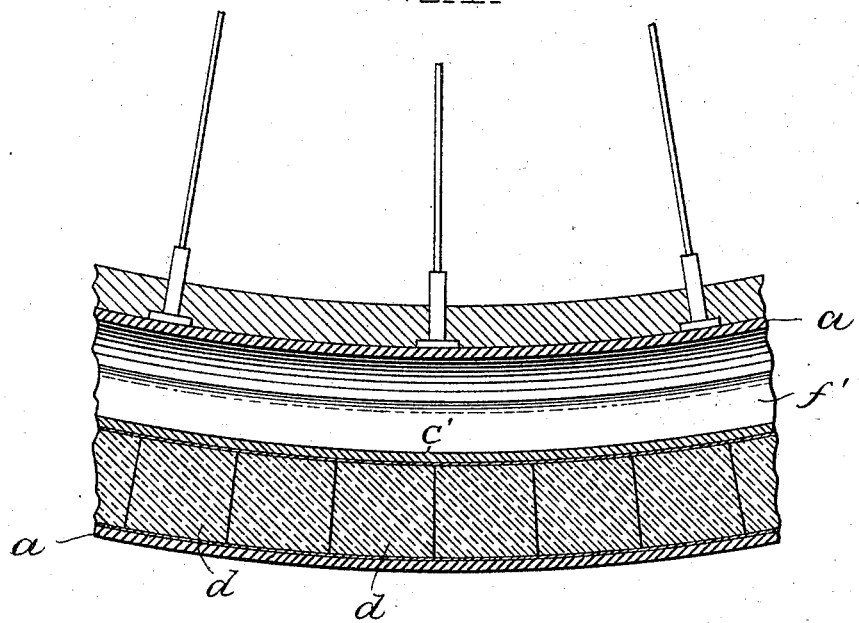
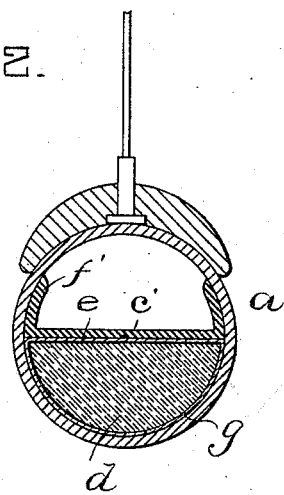
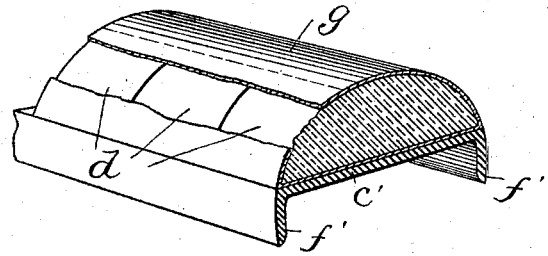
WITNESSES:
Rollin Abell
P. W. Pezzetti
INVENTOR:
George H. Mackay
by M. B. May
his Atty

UNITED STATES PATENT OFFICE.

GEORGE H. MACKAY, OF SALEM, NEW HAMPSHIRE, ASSIGNOR, BY MESNE ASSIGNMENTS, TO THE EUREKA TIRE COMPANY, OF BOSTON, MASSACHUSETTS.

VEHICLE-TIRE.

SPECIFICATION forming part of Letters Patent No. 580,345, dated April 6, 1897.

Application filed May 8, 1896. Serial No. 590,728. (No model.)

*To all whom it may concern:*

Be it known that I, GEORGE H. MACKAY, of Salem Depot, in the county of Rockingham and State of New Hampshire, have invented certain new and useful Improvements in Vehicle-Tires, of which the following is a description sufficiently full, clear, and exact to enable those skilled in the art to which it appertains or with which it is most nearly connected to make and use the same.

This invention has relation to yielding tires for vehicle-wheels, and while it is more particularly adapted for the wheels of carriages, wagons, racing-sulkies, &c., yet it may be equally well employed on the wheels of bicycles and tricycles.

It is the object of the invention to provide a tire which shall be light, durable, and practically puncture-proof and at the same time resilient to the highest degree compatible with strength and durability.

To these ends the invention consists of a tire possessing those features and characteristics which I shall hereinafter proceed to describe in detail and then point out in the claims hereto appended.

Reference is to be had to the accompanying drawings, and to the letters marked thereon, forming a part of this specification, the same letters designating the same parts or features, as the case may be, wherever they occur.

Of the drawings, Figure 1 illustrates one form of tire in which my invention may be embodied, the latter being shown in longitudinal vertical section. Fig. 2 is a vertical cross-section of the same. Fig. 3 is a detail view illustrating the cork and the covering for the same, together with the partition-wall of the tube, before the same have been secured within the tube.

In carrying out my invention I employ a tube $a$, which may be formed of any suitable material for the purpose and which may be secured in the rim $b$ by any means that may prove most desirable. The tire is so constructed as to be of the nature of a pneumatic tire and at the same time be proof against those accidents which are always liable to happen to pneumatic tubes, such as collapsing, as a result of a puncture or abrasion of the same.

The tube $a$ is divided into two compartments by a partition-wall $c'$, having its edges cemented or otherwise rigidly secured to the inner walls of the envelop or tread $a$. The inner compartment is adapted to be inflated with air introduced thereinto through a valve, (not shown,) and in the outer compartment I place sections of cork or equivalent light material to act as an armor or protection to the air-compartment. Thus it will be seen that the tire is possessed of that resiliency found in pneumatic tires and at the same time is protected against injury. Preferably the cork is semicircular in cross-section, as illustrated in Fig. 3, and is cut into short blocks or sections, each of which is movable independently of the others.

By referring to Fig. 1 it will be seen that the flat abutting faces of the cork section are radial of the axis of the wheel—that is to say, that the cork sections have their abutting faces converging toward the said axis of the wheel, being in the shape of a keystone of an arch.

The sections $d$, of cork, may all be cemented to a flat strip $e$, of canvas, rubber, or equivalent material, or else they may be entirely covered by a canvas jacket formed by an extension of the edges of said strip.

In forming the tire the cork is placed upon the tube $a$ in a grooved mold or matrix, and upon the flat faces thereof I lay a strip of canvas or rubber $e$, and upon that I secure the partition-wall $c'$, which is preferably formed of rubber, canvas, &c., and the edges of which project out beyond the edges of the cork sections.

The edges $f'$ of the partition-wall are then firmly cemented to the inner walls of the tube $a$, and the latter is bent into a tube and its edges secured together. When this has been done, it will be perceived that a tube has been formed having two compartments, in one of which the cork has been secured and in the other of which air may be pumped in the ordinary way through valves provided for the purpose.

By having the edges $f'$ of the partition-wall project inwardly toward the center of the wheel I secure an important result—that is to say, that the greater the pressure of the air within the pneumatic compartment the more tightly the edges $f'$ are bound against the inner walls of the tube $a'$.

The advantages incident to a construction of this nature are numerous. By providing two compartments, the outer one of which is filled with sections of cork capable of having a limited movement relatively to each other and the other of which is a pneumatic tube, I am enabled to provide, as aforesaid, a tire which is practically puncture-proof, while having all the properties of an ordinary hose-pipe pneumatic tire, and which is light and durable, as well as simple in construction and highly efficient for all the purposes to which vehicle-tires are put. The sections of cork are maintained in position by the canvas and may be easily removed from or inserted into the inclosing tube.

By employing the sections of cork or equivalent material, provided, as aforesaid, with the converging abutting faces, the sections lie closely together to prevent the formation of ridges or hollows when the tire is bent into circular form to be placed upon the wheel. If the said sections had parallel abutting faces, they would separate so as to leave spaces between them upon the placing of the tire upon the wheel, and the tire itself would soon become worn or "lumpy."

I provide what is termed a "single-tube" tire, which does not require the presence of an inner tube, since it is formed of a single envelop or tread, provided, as before said, with a partition-wall which becomes practically an integral portion of the tire. When the air-compartment is fully inflated for use, the tire will not flatten upon the ground, and hence the loss of power due to such flattening or compression will be greatly reduced, inasmuch as in contact with the ground it will never be widened, even though the air-tube itself be flattened or compressed.

Heretofore the breadth of the contact of the periphery of the tube depended upon the degree of the air-pressure in the tire, since it was greatest when the tube was partially deflated and least when it was inflated to its greatest extent, and hence to attain the highest possible speed it was necessary to increase to the greatest extent the air-pressure in the tube; but this increase of the air-pressure rendered the tire itself very hard and reduced to a minimum its resilient qualities, whereas my tire being constructed of sections of cork which do not easily flatten or compress may be inflated to but a moderate degree, so that the rider is prevented from being jarred or shocked without increasing the contact between the tire and the ground, so as to lessen the power. Again, the cork being in sections, that section only which is in contact with the ground is forced toward the center of the wheel relatively to the other sections, so as to increase the pressure within the tube, thereby increasing the pressure upon the sections just leaving the ground in such way as to impel the wheel forward, as will be readily understood by any one skilled in the art.

Having thus explained the nature of the invention and described a way of constructing and using the same, though without attempting to set forth all of the forms in which it may be made or all of the modes of its use, it is declared that what is claimed is—

1. A vehicle-tire formed of an inclosing tube having its longitudinal edges brought together and united, a partition-wall dividing the tube into two compartments, and having its edges secured to the inner walls of said tube, and sections of cork having converging flat faces and placed in the outer compartment of said tube, the inner compartment of said tube being inflatable, substantially as set forth.

2. In a vehicle-tire, the combination with an inclosing tube having its longitudinal edges brought together and united, and a partition-wall dividing the tube into two compartments and having its edges extending in toward the center of the wheel and secured to the walls of said tube, the inner compartment being inflatable, of sections of cork having flat abutting faces arranged radially of the wheel and placed within the outer compartment, substantially as set forth.

In testimony whereof I have signed my name to this specification, in the presence of two subscribing witnesses, this 7th day of May, A. D. 1896.

GEORGE H. MACKAY.

Witnesses:
JOEL E. RICHARDSON,
ARTHUR W. CROSSLEY.